(12) United States Patent
Kondo

(10) Patent No.: US 12,230,305 B2
(45) Date of Patent: Feb. 18, 2025

(54) MAGNETIC DISK DEVICE HAVING HEATER TO ADJUST SPACING BETWEEN MAGNETIC DISK AND MAGNETIC HEAD

(71) Applicants: Kabushiki Kaisha Toshiba, Tokyo (JP); Toshiba Electronic Devices & Storage Corporation, Tokyo (JP)

(72) Inventor: Masayuki Kondo, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/458,923

(22) Filed: Aug. 30, 2023

(65) Prior Publication Data

US 2024/0312479 A1    Sep. 19, 2024

(30) Foreign Application Priority Data

Mar. 16, 2023  (JP) .................................. 2023-041995

(51) Int. Cl.
| | | |
|---|---|---|
| G11B 5/60 | (2006.01) | |
| G11B 5/49 | (2006.01) | |
| G11B 5/58 | (2006.01) | |
| G11B 5/596 | (2006.01) | |
| G11B 21/21 | (2006.01) | |
| G11B 5/00 | (2006.01) | |
| G11B 5/008 | (2006.01) | |

(52) U.S. Cl.
CPC ............ G11B 5/607 (2013.01); G11B 5/4961 (2013.01); G11B 5/581 (2013.01); G11B 5/59638 (2013.01); G11B 21/21 (2013.01); G11B 2005/0021 (2013.01); G11B 5/00821 (2013.01)

(58) Field of Classification Search
None
See application file for complete search history.

(56) References Cited

U.S. PATENT DOCUMENTS

| | | |
|---|---|---|
| 7,388,726 B1 | 6/2008 | McKenzie et al. |
| 9,070,397 B1 | 6/2015 | Ito et al. |
| 10,366,719 B1 | 7/2019 | Riddering et al. |
| 2010/0027155 A1 | 2/2010 | Taguchi |

*Primary Examiner* — Craig A. Renner
(74) *Attorney, Agent, or Firm* — Kim & Stewart LLP

(57) ABSTRACT

According to one embodiment, a magnetic disk device which supplies, at the time of startup of data write or startup of data read, electric power higher than steady electric power used to make, in advance, spacing between a magnetic disk and a magnetic head become saturated at a target value to a heater of the magnetic head for a specified time and, after an elapse of the specified time, gradually reduces the electric power to be supplied to the heater of the magnetic head to the steady electric power.

10 Claims, 16 Drawing Sheets

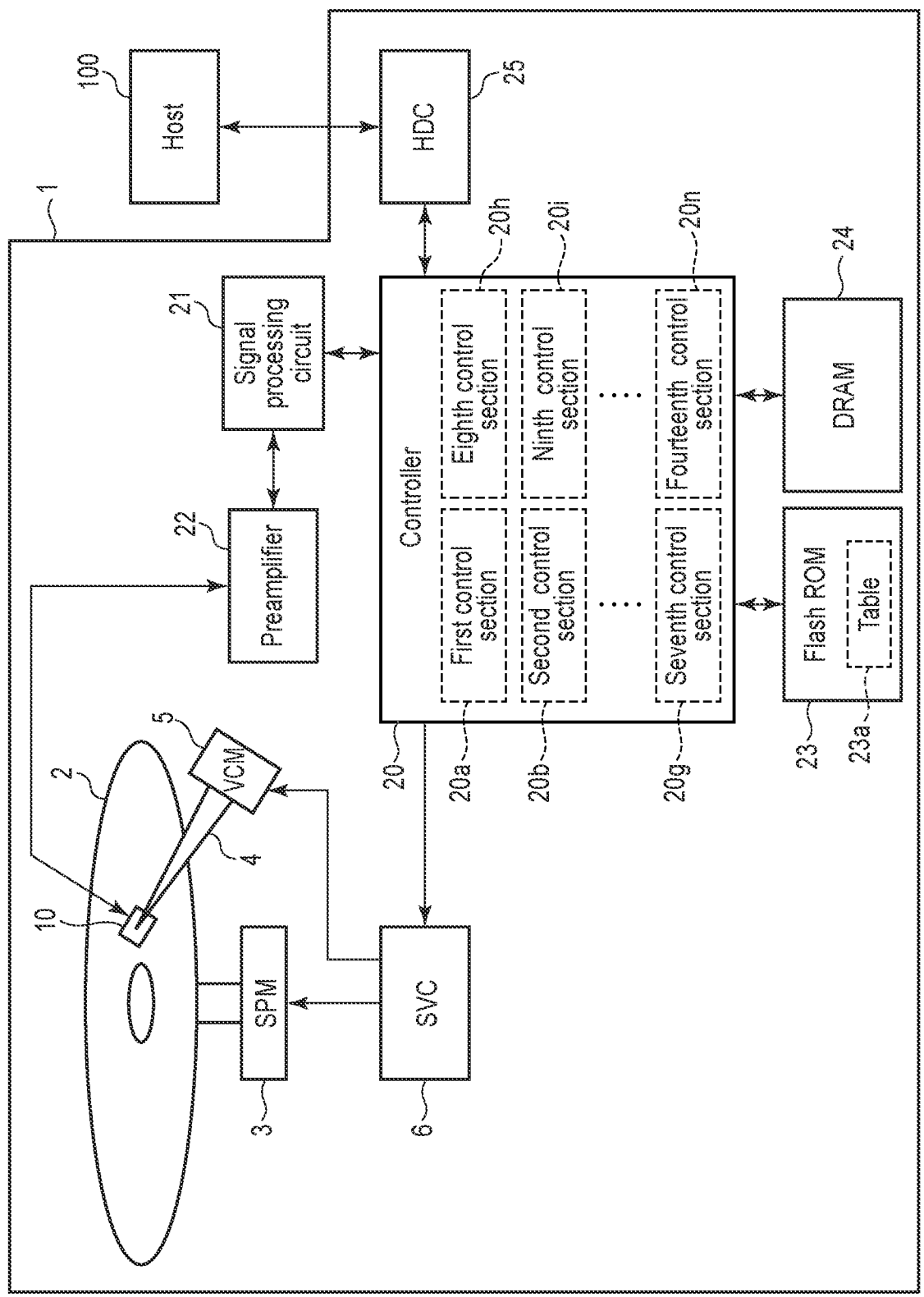
F I G. 1

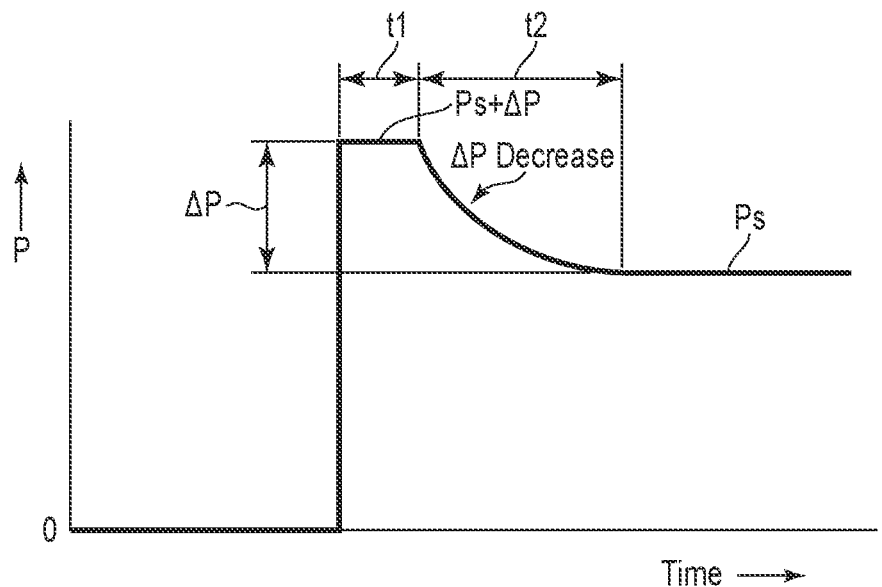
F I G. 10
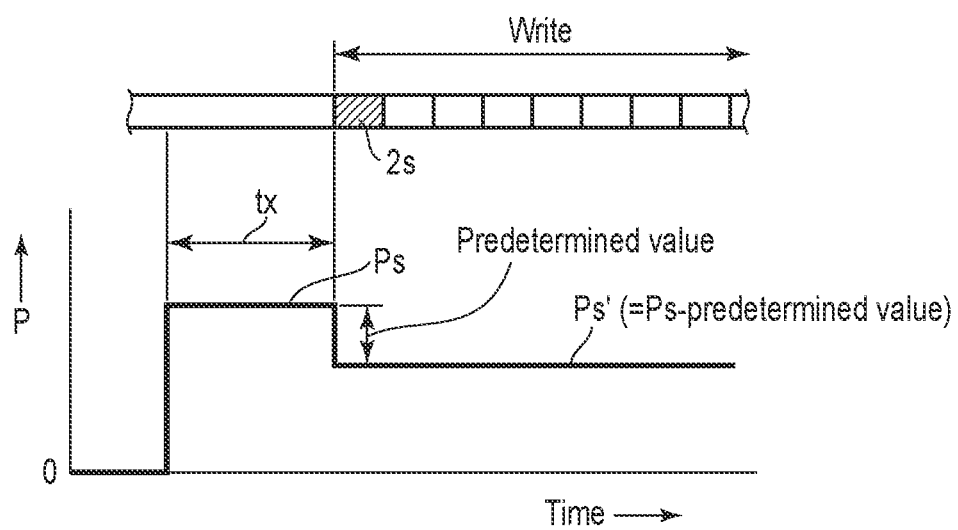
F I G. 11

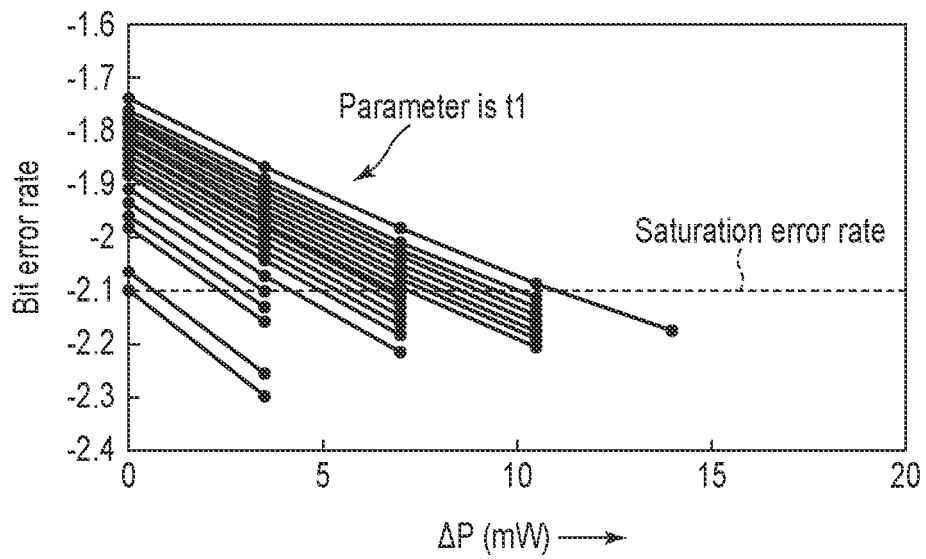
F I G. 16
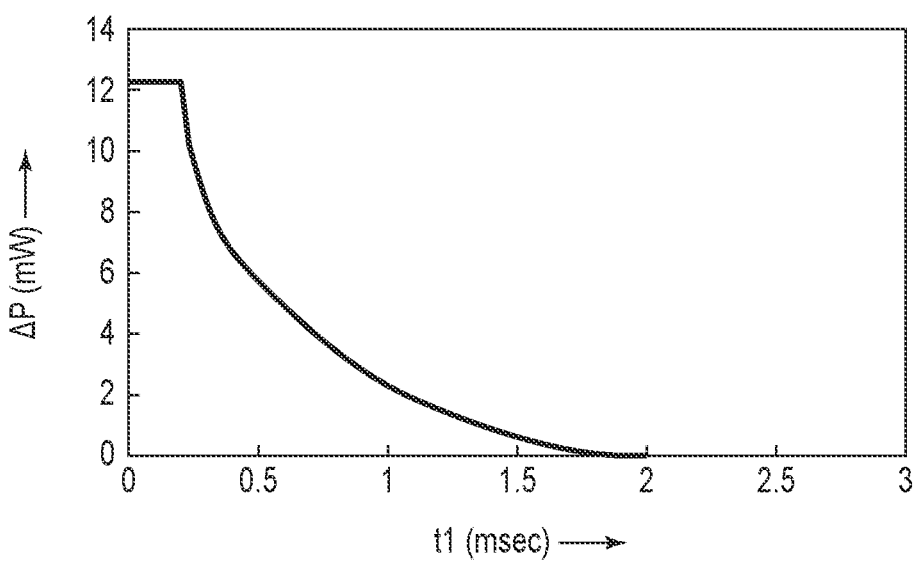
F I G. 17

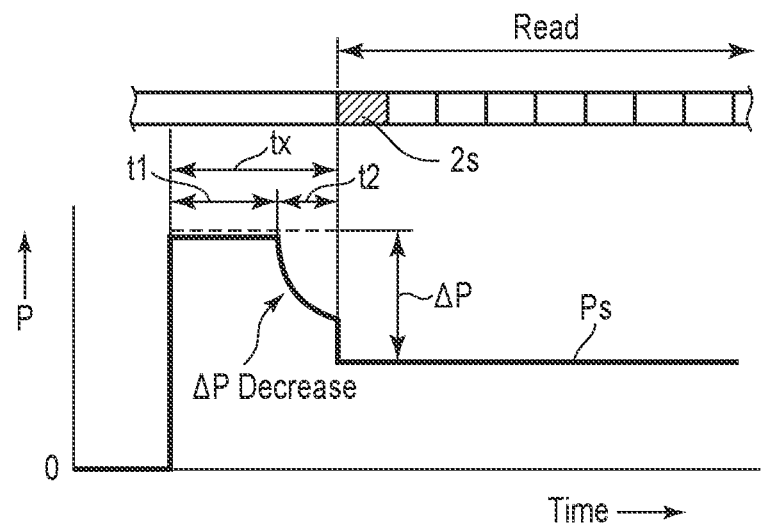
F I G. 23
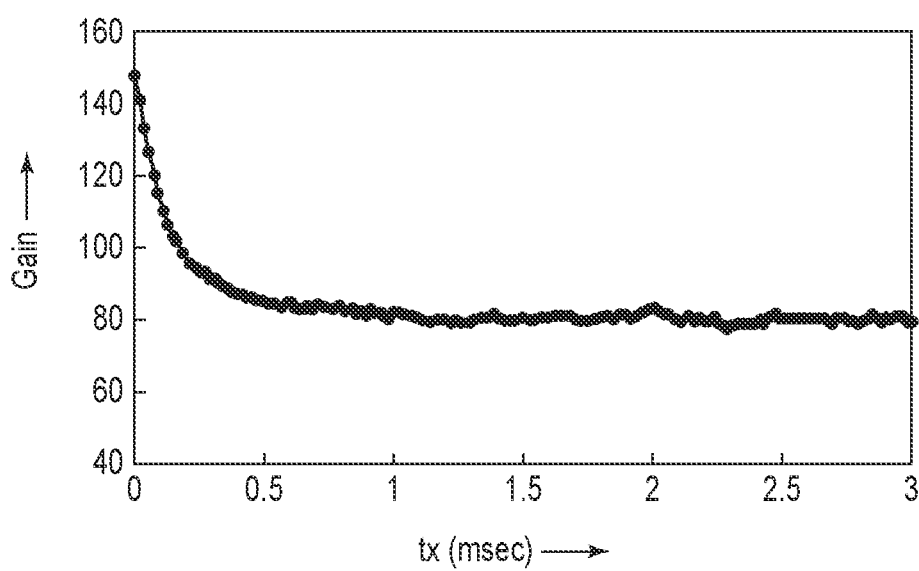
F I G. 24

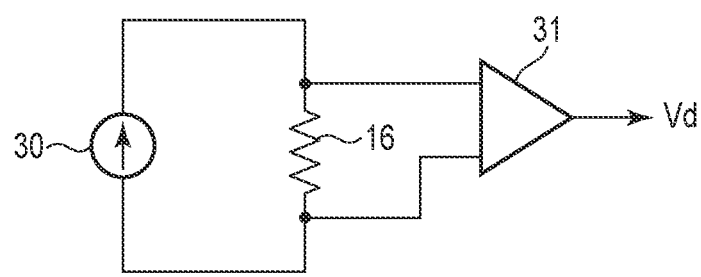
F I G. 25
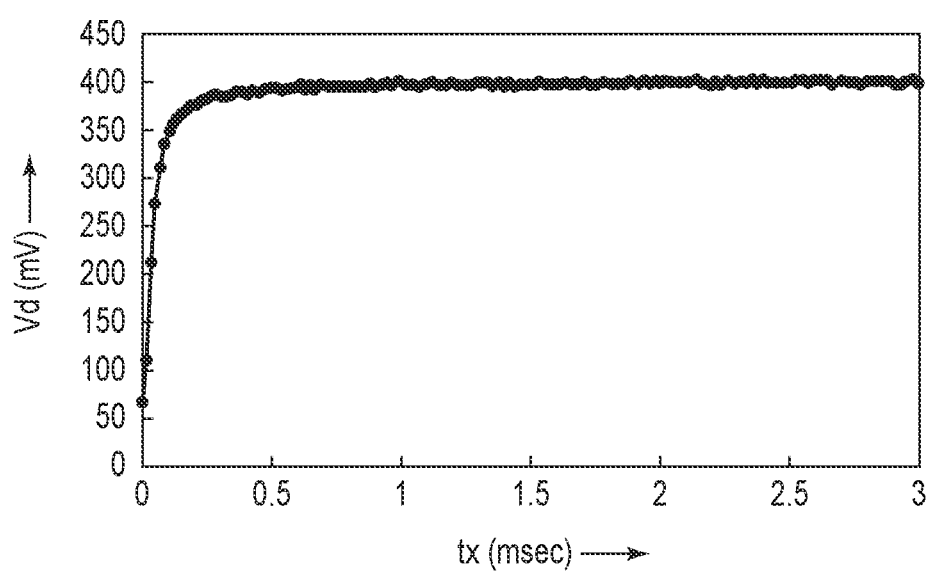
F I G. 26

MAGNETIC DISK DEVICE HAVING HEATER TO ADJUST SPACING BETWEEN MAGNETIC DISK AND MAGNETIC HEAD

CROSS-REFERENCE TO RELATED APPLICATIONS

This application is based upon and claims the benefit of priority from Japanese Patent Application No. 2023-041995, filed Mar. 16, 2023, the entire contents of which are incorporated herein by reference.

FIELD

Embodiments described herein relate generally to a magnetic disk device and method of controlling the device.

BACKGROUND

In a magnetic disk device including a magnetic disk and magnetic head configured to carry out write/read of data to/from the magnetic disk, an electric heater is provided in the magnetic head, the magnetic head is thermally expanded toward the magnetic disk side by heat generation of the electric heater, and interval between the magnetic disk and magnetic head, i.e., so-called spacing is controlled by the thermal expansion of the magnetic head.

At the time of spacing control, when supply of electric power to the electric heater is small, the magnetic head takes a lot of time to get close to the magnetic disk and, when supply of electric power to the electric heater is large, the magnetic head gets too close to the magnetic disk. For this reason, it has been an important subject how the supply of electric power to the electric heater is to be controlled.

BRIEF DESCRIPTION OF THE DRAWINGS

FIG. 1 is a view schematically showing the configuration of a first embodiment.

FIG. 10 is a view showing the control of supplying fixed additional electric power ΔP for an initial first time t1 and supplying gradually-decreasing additional electric power ΔP for a subsequent second time t2 when steady electric power Ps of an amount enabling the spacing H to become saturated at the target value Hs is supplied to the electric heater in the first embodiment.

FIG. 11 is a view showing first control of the first embodiment.

FIG. 16 is a view showing sixth control of the first embodiment.

FIG. 17 is a view showing seventh control of the first embodiment.

FIG. 23 is a view showing tenth and eleventh control of the second embodiment.

FIG. 24 is a view showing a relationship between a gain used to adjust a read signal to be obtained by the eighth control of the second embodiment to the optimum state and specified time tx.

FIG. 25 is a view schematically showing the configuration of a spacing sensor and peripheral circuit thereof in each of the first and second embodiments.

FIG. 26 is a view showing a relationship between an output voltage of the spacing sensor and specified time tx in the second embodiment.

DETAILED DESCRIPTION

Figure 2:
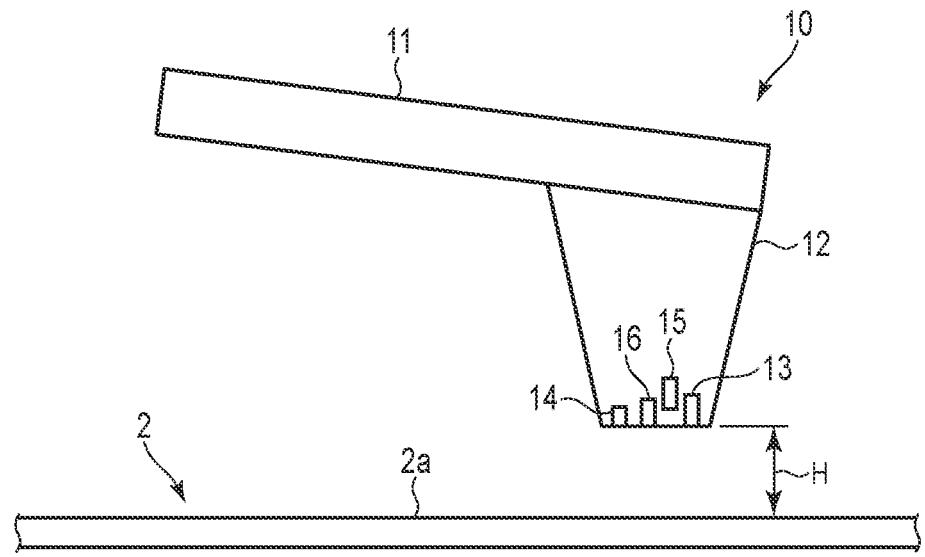
FIG. 2 is a view showing the configuration of a main part of a magnetic head in each of the first and second embodiments.

In general, according to one embodiment, a magnetic disk device includes
  a magnetic head including a write element used to write data to a magnetic disk, a read element used to read data from the magnetic disk, and further including a heater which generates heat by electric power to be supplied thereto and expands the magnetic head toward the magnetic disk side, and
  a controller which supplies, at the time of startup of data write, electric power higher than steady electric power used to make, in advance, spacing between the magnetic disk and the magnetic head become saturated at a target value to the heater for a specified time and, after an elapse of the specified time, gradually reduces the electric power to be supplied to the heater to the steady electric power.

DETAILED DESCRIPTION

Embodiments will be described hereinafter with reference to the accompanying drawings. Throughout the embodiments, common elements are denoted by like reference numerals, and a detailed description thereof may be omitted unless otherwise necessary. Further, in order to make the description clearer, the widths, thicknesses, shapes, etc., of the respective parts are schematically illustrated in the drawings, compared to the actual modes. These parts can be redesigned or remodeled as needed with reference to the following descriptions and the conventional techniques.

{1} First Embodiment

As shown in FIG. 1, a magnetic disk device 1 includes a magnetic disk 2 with a discoid shape as a recording medium. The magnetic disk 2 is attached to a rotating shaft of a spindle motor (SPM) 3 at a central part thereof, and receives the motive power of the spindle motor 3 to thereby be rotated in a predetermined direction. An arm-like actuator 4 is arranged in the vicinity of the magnetic disk 2. It should be noted that the configuration in which not only one magnetic disk 2 can be attached to the spindle motor 3 but also a plurality of magnetic disks 2 can also be attached to the spindle motor 3 is also acceptable. Magnetic heads 10 of a number corresponding to the number of magnetic disks 2 are provided. The spindle motor 3 is driven by electric power to be supplied thereto from an SVC 6 to be described later.

The actuator 4 is pivotally supported at a base end part thereof so as to be swingable at a position separate from the magnetic disk 2 and tip end part thereof extends to a position in the vicinity of the central part of the magnetic disk 2. A voice coil motor (VCM) 5 is arranged at a position corresponding to the base end part of the actuator 2 and tip end part of the actuator 4 is swung in in the radial direction between the inner circumference and outer circumference of the magnetic disk 2 by the motive power of the voice coil motor 5.

Figure 3:
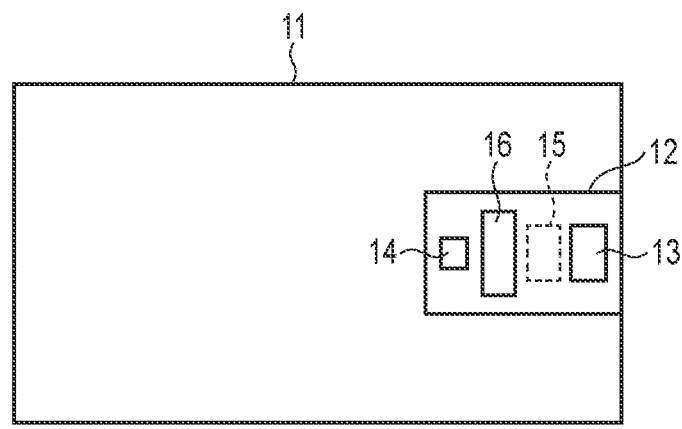
FIG. 3 is a view of the configuration of FIG. 2 viewed from the magnetic disk side.

A magnetic head 10 is arranged at the tip end part of the actuator 4. The magnetic head 10 includes, as shown in FIG. 2 and FIG. 3, a slider 11 at a tip end part thereof, includes a head element 12 on the undersurface side (the side opposed to the magnetic disk 2) of the slider 11, and is moved (seeks) in the radial direction of the magnetic disk 2 concomitantly with the swing of the actuator 4. A plurality of servos on which track information and positioning information are written are arranged at regular intervals along the circumference of the magnetic disk 2, and areas between these servos are used as data areas. At the time of rotation of the magnetic disk 2, the slider 11 receives wind pressure due to the rotation thereof to thereby levitate itself and levitate the magnetic head 10 in such a direction that the magnetic head 10 is separated from the magnetic disk 2.

The head element 12 includes a write element 13 configured to write magnetic data to the magnetic disk 2, read element 14 configured to read magnetic data from the magnetic disk 2, electric heater (also simply called a heater) 15 for heat generation, and spacing sensor (HDI sensor) 16 configured to detect a gap between the head element 12 and surface 2a of the magnetic disk 2, i.e., so-called spacing. The write element 13, read element 14, and spacing sensor 16 are directed to the undersurface of the head element 12 in an exposed state and are opposed to the surface 2a of the magnetic disk 2. The electric heater 15 is arranged inside the head element 12.

To a controller (CPU) 20 serving as the nerve center of control of the magnetic disk device 10, a servo combo (SVC) 6 configured to drive the spindle motor 3 and voice coil motor 5, signal processing circuit 21 including a read/write channel (R/W channel), flash ROM 23, DRAM 24, and hard disk controller (HDC) 25 are connected. Further, to the signal processing circuit 21, a preamplifier 22 is connected and, to the hard disk controller (HDC) 25, a host computer 100 is connected.

The preamplifier 22 supplies a write signal (write current) corresponding to write data to be supplied thereto from the signal processing circuit 21 to the write element 13, and amplifies a read signal to be output from the read element 14 to thereby supply the amplified read signal to the signal processing circuit 21. Further, the preamplifier 22 controls the supply of electric power to the electric heater 15 according to an instruction from the controller 20 to be given thereto through the signal processing circuit 21 and supplies an output of the spacing sensor 16 to the signal processing circuit 21.

The signal processing circuit 21 executes the processing of subjecting the read signal to be supplied thereto from the preamplifier 22 to digital conversion to thereby supply the digitalized read signal to the controller 20 and processing of subjecting write data to be supplied thereto from the controller 20 to analog conversion to thereby supply the analog write data to the preamplifier 22.

The hard disk controller 25 functions as an interface configured to control read/write of data together with the controller 20 and control transfer of read/write data between itself and host computer 100 including error correction processing and the like.

The controller 20 executes control of read/write, servo control necessary for positioning of the magnetic head 10 to a target track on the magnetic disk 2, control of electric power supply to the electric heater 15, and the like. The flash ROM 23 is a nonvolatile memory and stores therein control programs to be executed by the controller 20 and various data items. In the flash ROM (storage section) 23, an additional electric power table 23a (to be described later) to be used to control electric power supply to the electric heater 15 of the magnetic head is stored. The DRAM 24 is a volatile memory and functions as a work area or the like to be used by the controller 20 to execute the control programs stored in the flash ROM 23.

It should be noted that the controller 20, signal processing circuit 21, and hard disk controller may also be configured in such a manner as to be incorporated in a one-chip integrated circuit.

(Description of Spacing)

At the time of rotation of the magnetic disk 2, spacing occurs between the head element 12 and surface 2a of the magnetic disk 2 by the operation of the slider 11. In order to realize high density recording on the magnetic disk 2, it is necessary to reduce the spacing and minimize the distance between the head element 12 and surface 2a of the magnetic disk 2 to the utmost limit. When electric power is supplied to the electric heater 15 of the head element 12, the electric heater 15 generates heat and head element 12 is thermally expanded toward the magnetic disk 2 side by the heat generation. By this thermal expansion, the write element 13, read element 14, and spacing sensor 16 are thrust toward the magnetic disk 2 side to thereby be made close to the surface 2a of the magnetic disk 2. By controlling the electric power P to be supplied to the electric heater 15, it is possible to adjust the spacing H between the head element 12 and surface 2a of the magnetic disk 2 to an appropriate state.

Figure 4:
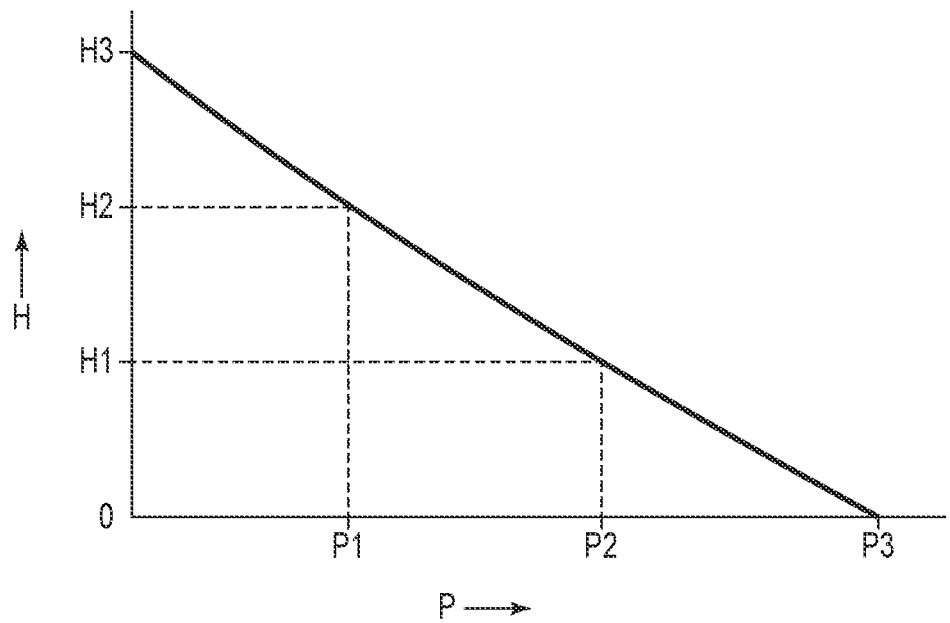
FIG. 4 is a view showing a relationship between electric power to be supplied to an electric heater and spacing in each of the first and second embodiments.
Figure 5:
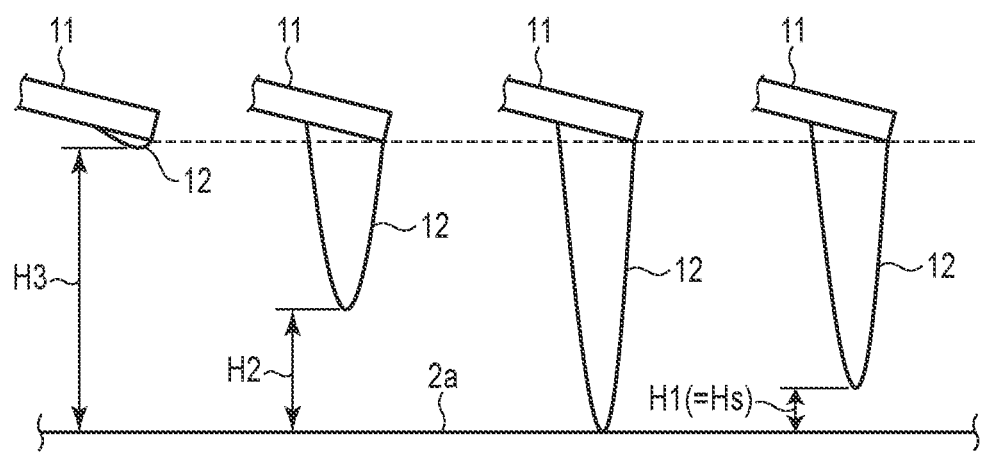
FIG. 5 is a view showing a state where thermal expansion of the magnetic head and spacing change according to a value of electric power to be supplied to the electric heater in each of the first and second embodiments.

A relationship between the electric power P to be supplied to the electric heater 15 and spacing H is shown in FIG. 4, and state where the thermal expansion of the head element 12 and spacing H change according to the value of the electric power P is shown in FIG. 5. When the electric power P is gradually increased from the state of 0 to P1, the head element 12 is thermally expanded toward the magnetic disk 2 side and spacing H is decreased from H3 to H2. When the electric power P is further increased to P3, the head element 12 is further expanded thermally whereby the spacing H becomes 0 and a touch-down state where the head element 12 comes into contact with the surface 2a of the magnetic disk 2 is brought about. When the electric power P is reduced from the touch-down state to P2, the thermal expansion of the head element 12 is reduced whereby the head element 12 is separated from the surface 2a of the magnetic disk 2 and spacing H becomes H1 (=for example, target value Hs) greater than 0.

The levitation amount of the magnetic head 10 created by the slider 11 is affected by the influence of the individual difference of the magnetic head 10, seek position of the magnetic disk 2 in the radial direction, change in the environmental temperature, and the like and does not become constant. For this reason, the adjustment of guiding the spacing H to the target value Hs by using the electric power P bringing about the touch-down state as a reference has been a general way of coping heretofore.

Figure 6:
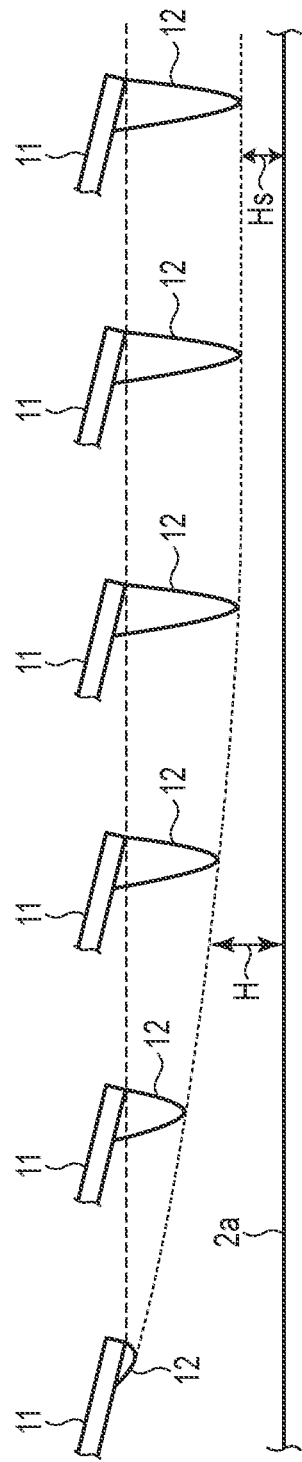
FIG. 6 is a view showing a state where thermal expansion of the magnetic head and spacing change when steady electric power of an amount enabling the spacing to become saturated at a target value is continuously supplied to the electric heater in each of the first and second embodiments.

A state where thermal expansion of the head element 12 and spacing H change when steady electric power Ps of an amount enabling the spacing H to become saturated at the desired target value Hs is continuously supplied to the electric heater 15 is shown in FIG. 6. By the supply of the steady electric power Ps, the thermal expansion of the head element 12 is gradually increased and, concomitantly with the increase, the spacing H is gradually decreased and becomes saturated at the target value Hs.

In order to utilize the characteristics of the magnetic head 10 and magnetic disk 2 to the utmost limit, it becomes necessary that use be made in a state where the spacing H has become sufficiently saturated. However, at the time of startup of data write or at the time of startup of data read, a certain fixed time is required from the start of supply of the electric power P to the time when the spacing H reaches the target value Hs. If data write is executed before the spacing H reaches the target value Hs, a write defect due to deficiency in the write performance occurs. If data read is executed before the spacing H reaches the target value Hs, a read error due to deficiency in the read output is caused in some cases. Regarding the read error, the spacing H is stabilized by wait for rotation, and hence the read error can be relieved by reread to be carried out by retry.

However, at the time of data write, it is necessary to securely write data, and hence a function normally called preheat is provided. This is a function of supplying predetermined electric power P for a certain fixed time from before the startup of the data write, and write is in the inhibited state until the preheat time elapses. It is necessary to set in advance the preheat time to a value enabling the spacing H to become sufficiently saturated or to a value by which a predetermined error rate is obtained in the read data. As described, however, the levitation amount of the magnetic head 10 created by the slider 11 is affected by the influence of the individual difference of the magnetic head 10, seek position of the magnetic disk 2 in the radial direction, change in the environmental temperature, and the like and does not become constant, and hence all the preheat times should be determined according to a condition requiring the longest preheat time. Further, when the preheat times are adjusted on an individual basis, it is generally carried out to change the preheat time according to the individual condition and set the electric power P of preheat to a value of an amount enabling the spacing H to become saturated at the target value Hs. The preheat time is a time for which write startup is securely waited, and hence when a write startup sector falls within this time, write is started after a wait for one rotation. Regarding such a situation, the longer the preheat time, the higher the probability of occurrence thereof becomes, whereby the situation leads to performance deterioration.

At the time data write, a magnetic field is generated by making an electric current flow through the write element 13, and magnetic pole of the magnetic disk 2 is arbitrarily changed by the magnetic field. Heat generation is caused by also the flow of the electric current through the write element 13 and the head element 12 is thermally expanded. For this reason, at the time of data write, it is necessary to reduce the electric power P to be supplied to the electric heater 15 to a smaller value as compared with the value at the preheat time in such a manner that the spacing H becomes saturated at the target value Hs by both the heat generation component based on the flow of the electric current through the write element 13 and heat generation component of the electric heater 15.

It should be noted that the read error at the time of data read can be relieved by retry as described above, and hence preheat is not carried out. Even when the read startup position and supply startup timing of the electric power P overlap each other, no wait for rotation occurs only if no read error occurs. However, it is a problem that immediately after the supply startup of the electric power P, the spacing H is large, read error due to output deficiency in the read data occurs, and probability of occurrence of performance deterioration due to retry processing becomes high.

Embodiments described herein aim to make it possible to securely lead the spacing H to the target value Hs without being affected by the influence of the individual difference of the magnetic head 10, position of the magnetic disk 2 in the radial direction, change in the environmental temperature, and the like and, moreover, to shorten the time required for the spacing H to reach the target value Hs.

Figure 7:
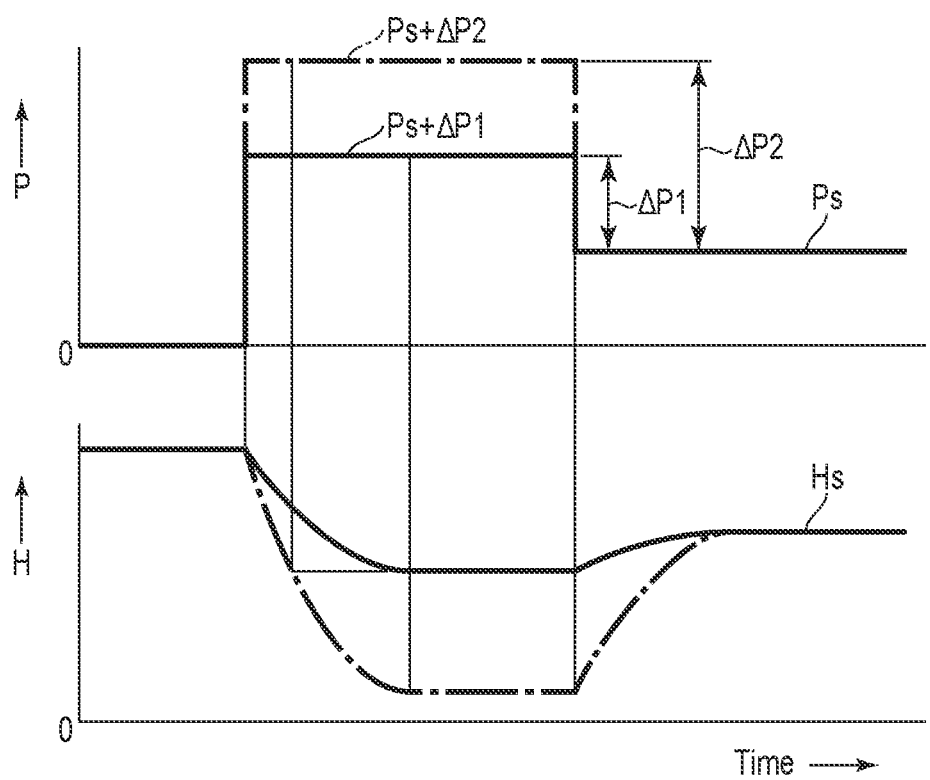
FIG. 7 is a view in which, when steady electric power of an amount enabling the spacing to become saturated at the target value is supplied to the electric heater, a change in the spacing of a case where additional electric power ΔP1 is supplied at the beginning and change in the spacing of a case where additional electric power ΔP2 is supplied at the beginning are shown in comparison with each other in each of the first and second embodiments.

A change in the spacing H of a case where additional electric power $\Delta P1$ is supplied at the beginning and change in the spacing H of a case where additional electric power $\Delta P2$ ($>\Delta P1$) is supplied at the beginning when steady electric power Ps of an amount enabling the spacing H to become saturated at the target value Hs is supplied to the electric heater 15 are shown in FIG. 7 in comparison with each other. The time required for the spacing H to enter the same state is shorter in the case where the additional electric power $\Delta P2$ is supplied than in the case where the additional electric power $\Delta P1$ is supplied. Further, in terms of the same period of time, the spacing H becomes smaller in the case where the additional electric power $\Delta P2$ is supplied than in the case where the additional electric power $\Delta P1$ is supplied. Further, the spacing H largely changes immediately after the electric power P is reduced and then gradually becomes saturated at a value corresponding to the supplied electric power P. Accordingly, by supplying a large amount of electric power P, it is possible to make the spacing H reach the target value Hs in a short time. However, in order to maintain the spacing H constantly at the target value Hs, it is necessary to consider a way to reduce the electric power P.

Figure 8:
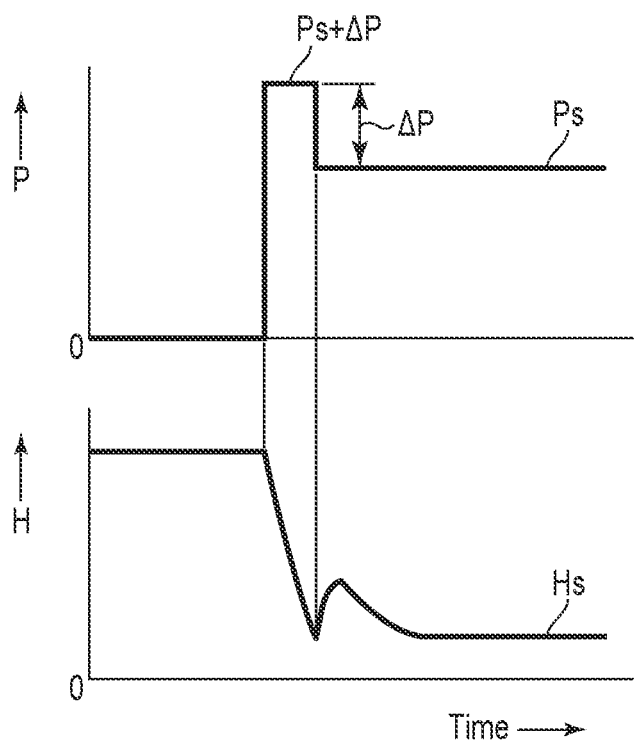
FIG. 8 is a view showing a change in the spacing of a case where fixed additional electric power ΔP of a square waveform is supplied at the beginning when steady electric power of an amount enabling the spacing to become saturated at the target value is supplied to the electric heater in each of the first and second embodiments.

A change in the spacing H of a case where fixed additional electric power ΔP of a square waveform is supplied at the beginning when steady electric power Ps of an amount enabling the spacing H to become saturated at the target value Hs is supplied to the electric heater 15 is shown in FIG. 8. In this case, the spacing carries out an operation of largely varying once at the point in time when the additional electric power ΔP becomes 0 and thereafter becoming saturated and stabilized. In order to stabilize the error rate, it is necessary to avoid a phenomenon in which the spacing H once becomes larger.

Figure 9:
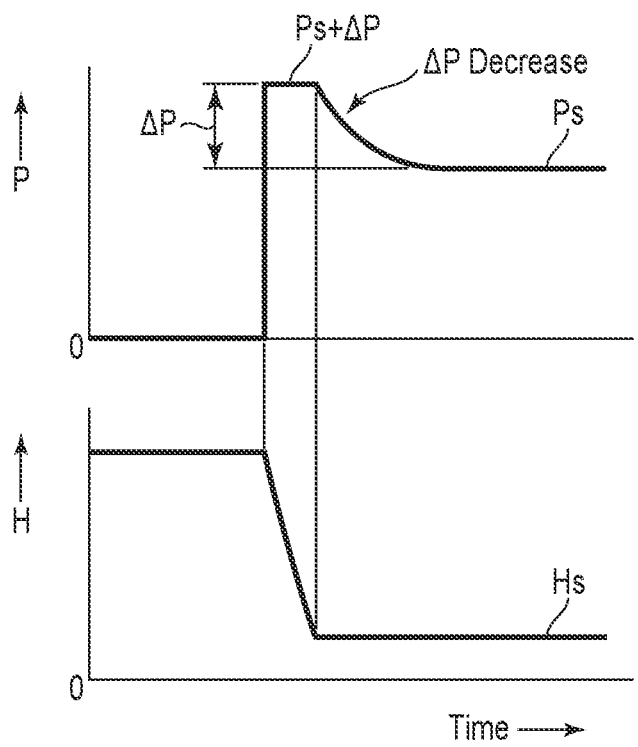
FIG. 9 is a view showing a change in the spacing of a case where fixed additional electric power ΔP is supplied at the beginning and, subsequently, gradually-decreasing additional electric power ΔP is supplied when steady electric power of an amount enabling the spacing to become saturated at the target value Hs is supplied in advance to the electric heater at the time of startup of data write in the first embodiment.

A change in the spacing H of a case where fixed additional electric power ΔP is supplied at the beginning and, subsequently, gradually-decreasing additional electric power ΔP is supplied when steady electric power Ps of an amount enabling the spacing H to become saturated at the target value Hs is supplied in advance to the electric heater 15 at the time of startup of data write is shown in FIG. 9. The phenomenon where the spacing H once becomes larger is avoided.

In consideration of the above, the controller executes control of supplying electric power (first electric power) P higher than the steady electric power (second electric power) Ps configured to make the spacing H become saturated in advance at the target value Hs to the electric heater 15 for the specified time tx at the time of startup of data write and, after an elapse of the specified time tx, gradually reducing the electric power Ps to be supplied to the electric heater 15 to the steady electric power Ps. The steady electric power (second electric power) Ps is less than the electric power P (first electric power).

More specifically, the controller 20 executes, as shown in FIG. 10, when supplying the steady electric power Ps of an amount enabling the spacing H to become saturated at the target value Hs to the electric heater 15, control of supplying the fixed additional electric power ΔP for the initial first time t1 and supplying, for the subsequent second time t2, gradually-decreasing additional electric power ΔP. Then at the time of data write after the elapse of the second time t2, the controller 20 continues the supply of the steady electric power Ps so that the spacing H can maintain the state where the spacing H has reached the target value Hs. Owing to this control, it is possible to make the time required for the spacing H to reach the target value Hs shorter as compared with the case where only the steady electric power Ps is supplied.

Supplying the additional electric power ΔP is also called an offset. The first time t1 is also called the preheat time or additional time. The second time t2 is also called the additional electric power decreasing (reducing) time. Regarding the values of the first time t1 and additional electric power ΔP to be supplied for the first time t1, the controller 20 variably sets the values on the basis of an additional electric power table 23a (to be described later) stored in the flash ROM 23. The contents of the additional electric power table 23a are made freely rewritable according to the measurement result and the like. Regarding the method of controlling the electric power P, any one of phase control, voltage control, on/off control, and the like may be used. The preamplifier 22 executes one of these control items.

Further, in order to cope with the fact that the levitation amount of the magnetic head 10 created by the slider 11 is affected by the influence of the individual difference of the magnetic head 10, seek position of the magnetic disk 2 in the radial direction, change in the environmental temperature, and the like and does not become constant, the controller includes the following first to seventh control sections 20a, 20b, . . . , 20g as functions of measuring the characteristics of the magnetic head 10 and periphery thereof.

(1) The first control section 20a executes, as shown in FIG. 11, first control of supplying the steady electric power Ps to the electric heater 15 for just the specified time tx and subsequently writing data for error rate measurement to one predetermined sector (also called a target sector) 2s of the magnetic disk 2 while supplying the steady electric power Ps' of an amount enabling the spacing H at the time of data write to become saturated at the target value Hs to the electric heater 15. This is the control to be carried out to measure the spacing saturation time. The steady electric power Ps' has a value less than the steady electric power Ps by an amount corresponding to an increase in the heat generation due to the current flowing through the write element 13 at the time of data write.

Figure 12:
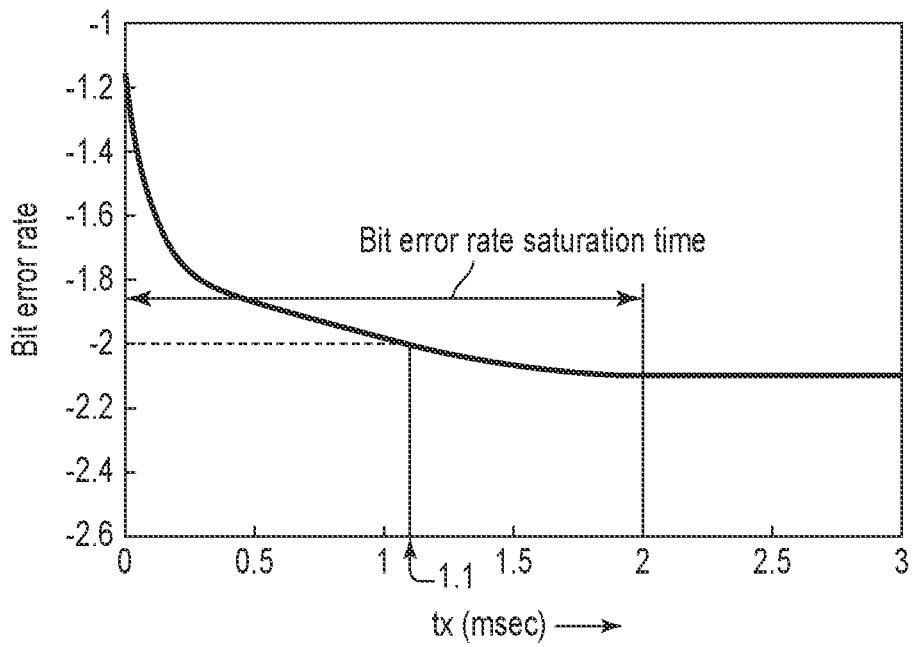
FIG. 12 is a view showing second control of the first embodiment.

(2) The second control section 20b executes second control of repetitively executing the above-described first control (repetitively, for example, one hundred times) while changing the specified time tx of FIG. 11 in steps of a fixed amount of time Δt in the direction of increase in a stepwise manner, measuring the bit error rate of data to be written to the above-described target sector 2s for each execution operation of the first control, and correlating the measurement result with the specified time tx as shown in FIG. 12.

The second control is control to be carried out to determine a time for which the electric power ΔP should be continuously supplied until the error rate reaches a value at which the error rate becomes saturated, i.e., "−2.1" or until the error rate reaches a permissible required value "for example, −2.0".

Owing to this second control, the error rate saturation characteristics can be obtained. The measurement is error rate measurement in the same target sector 2s, and hence the cause of variation in the error rate becomes only the influence of the spacing H, and the error rate saturation characteristics can be treated by regarding the characteristics as being equivalent to the spacing saturation characteristics. In the example of FIG. 12, a time of "3 msec" or longer is given as the preheat time (electric power addition time) and a time in which a sufficiently saturated error rate can be obtained is measured, whereby it is possible to measure the error rate saturation time "2 msec" and determinably consider the aforementioned error rate saturation time to be the spacing saturation time. Further, the error rate saturation time can be defined by also a required error rate at which no read error occurs and, for example, when the required error rate at which no read error can occur is "−2.0", "1.1 msec" is obtained.

Figure 13:
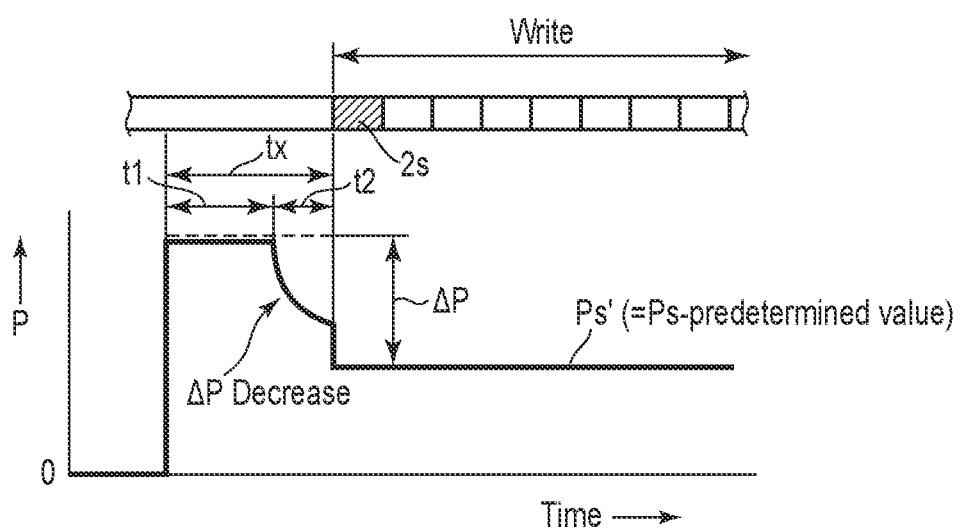
FIG. 13 is a view showing third and fourth control of the first embodiment in a solid line.

(3) The third control section 20c executes, as indicated by a broken line in FIG. 13, third control of selecting the specified time tx (=2.0 msec or 1.1 msec) at the time when the bit error rate becomes the target value (saturation value "−2.1" or required value "−2.0"), the specified time tx being among the specified times tx changing in a stepwise manner in the above-described second control, as the spacing saturation time, supplying the electric power "Ps'+ΔP" to the electric heater 15 within the spacing saturation time tx and, after an elapse of the spacing saturation time tx, writing data for error rate measurement to the above-described target sector 2s while supplying the steady electric power Ps' to the electric heater 15.

(4) The fourth control section 20d executes, as indicated by a solid line in FIG. 13, fourth control of setting the first time t1 at the beginning of the spacing saturation time tx, supplying the predetermined additional electric power ΔP for the first time t1, and gradually reducing the additional electric power ΔP for the remaining second time t2 (=tx−t1) extending to the end of the spacing saturation time tx.

Figure 14:
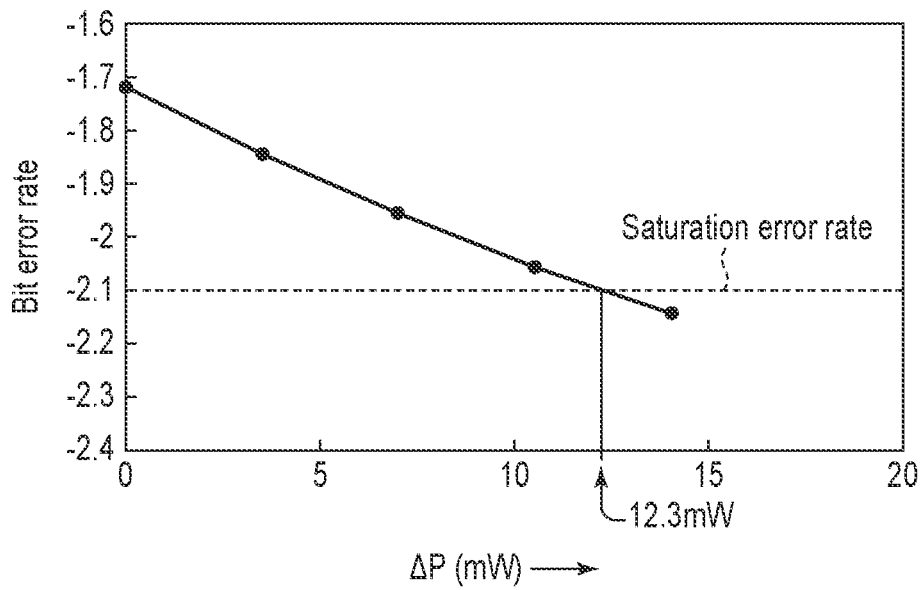
FIG. 14 is a view showing fifth control of the first embodiment.

(5) The fifth control section 20e executes fifth control of repetitively executing the above-described fourth control while changing the additional electric power ΔP in the direction of increase in a stepwise manner in a state where the spacing saturation time tx (=2.0 msec) of FIG. 13 is set by shortening the length thereof to a desired value, e.g., 0.2 msec, measuring the bit error rate of data to be written to the above-described target sector for each execution operation of the fourth control, and correlating the measurement result with the value of the additional electric power ΔP as shown in FIG. 14. In order to obtain the spacing saturation time tx (=0.2 msec), it is sufficient if the additional electric power ΔP is set to "12.3 mW".

In the error rate measurement to be carried out in the state where the additional electric power ΔP is supplied, there is a possibility of the head element 12 coming into contact the magnetic disk 2. In order to avoid such a situation, the fifth control section 20e measures the bit error rate while increasing the additional electric power ΔP from a low value, and interrupts the measurement at the stage where the predetermined bit error rate has been obtained. It is necessary to limit the sectors for data write to only the target sectors 2s and stop the supply of the electric power P immediately after write completion. Regarding acquisition of the electric power P to be supplied at the time of data write, it is sufficient if the electric power P is obtained from the additional electric power ΔP and approximate expression of the error rate.

Figure 15:
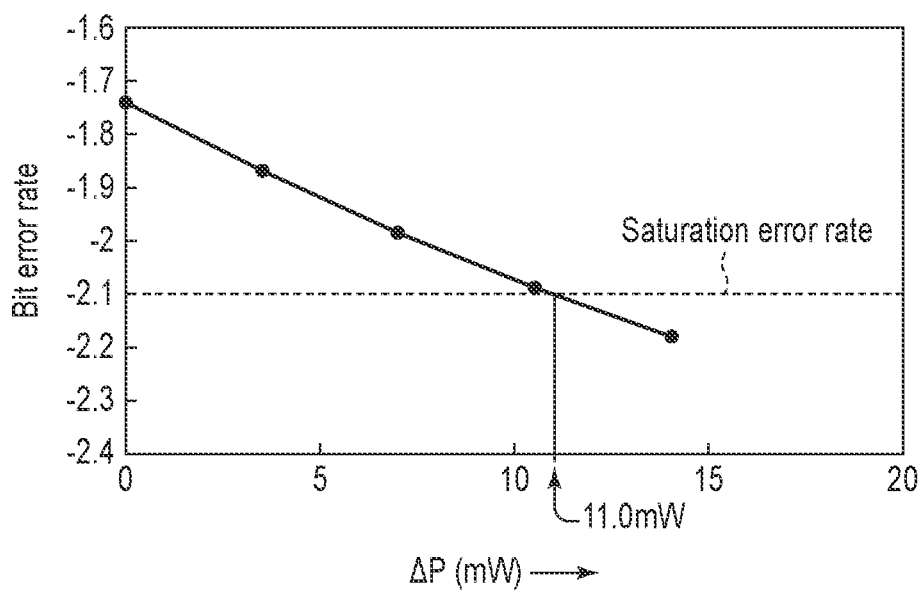
FIG. 15 is a view showing the fifth control of the first embodiment.

This fifth control may also be control of repetitively executing the above-described fourth control while changing the additional electric power ΔP in the direction increase in a stepwise manner in a state where the spacing saturation time tx (=2.0 msec) of FIG. 13 is set by shortening the length thereof to a desired value, e.g., 0.22 msec, measuring the bit error rate of data to be written to the above-described target sector 2s for each execution operation of the fourth control, and correlating the measurement result with the value of the additional electric power ΔP as shown in FIG. 15. In order to obtain the spacing saturation time tx (=0.22 msec), it is sufficient if the additional electric power ΔP is set to "11.0 mW".

(6) The sixth control section 20f executes sixth control of changing the first time t1 of FIG. 13 from, for example 0.22 msec to 2.0 msec in the direction of increase in a stepwise manner in steps of a fixed amount of time (for example, 0.02 msec) Δt, supplying, for the first time t1, the additional electric power ΔP (="12.3 mW") at the time when the bit error rate measured in the above-described fifth control becomes saturated, repetitively executing the above-described fourth control while gradually reducing the additional electric power ΔP for the remaining second time t2 (=tx−t1) extending to the end of the spacing saturation time tx, measuring the bit error rate of data to be written to the above-described target sector 2s for each execution operation of the fourth control, correlating the measurement result with the value of the additional electric power ΔP as shown in FIG. 16, and retaining the first time t1 changing in a stepwise manner as a parameter.

(7) The seventh control section 20g executes, as shown in FIG. 17, seventh control of determining a relationship between the first time t1 at the time when the saturation error rate of each bit error rate measured in the above-described sixth control becomes the predetermined value (saturation value "−2.1" or required value "−2.0") and additional electric power ΔP as an additional electric power table 23a, and storing the additional electric power table 23a in the flash ROM 23. FIG. 17 is an example of an additional electric power table 23a corresponding to the saturation error rate (saturation value "−2.1"). An additional electric power table 23a corresponding to the saturation error rate (required value "−2.0") may be created and stored in the flash ROM 23. It is also possible to store a large number of additional electric power tables 23a each corresponding to each of saturation error rates of the bit error rates in the flash ROM 23.

Figure 18:
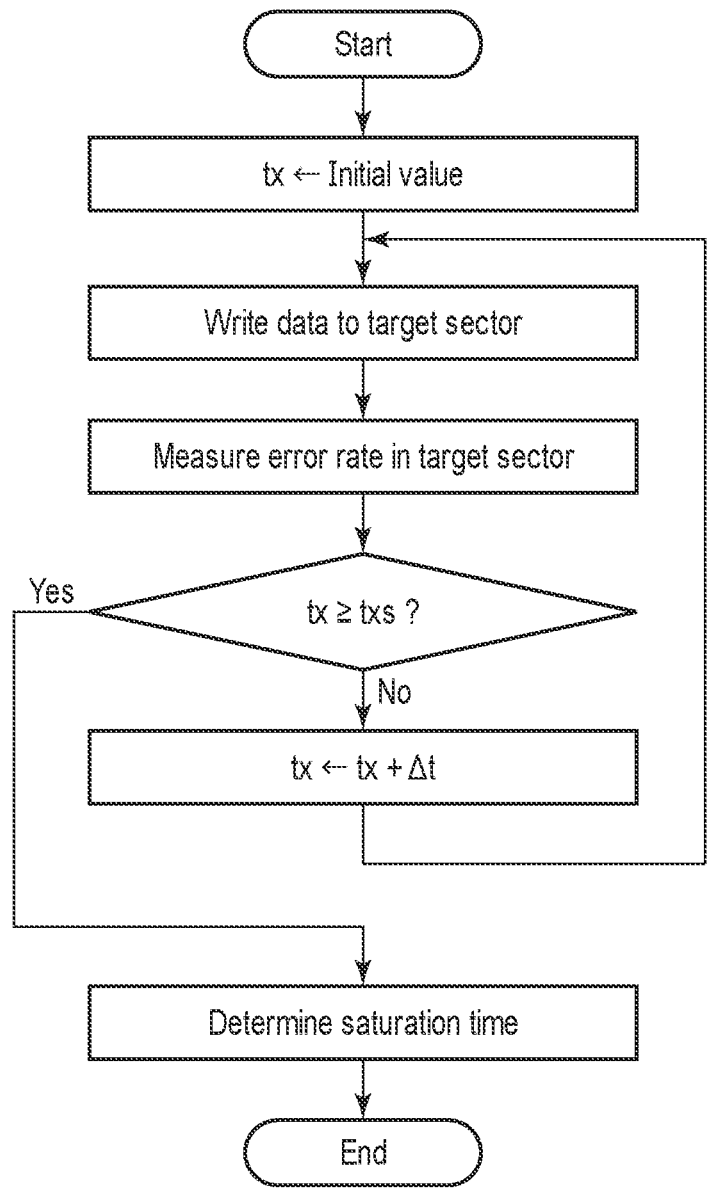
FIG. 18 is a flowchart schematically showing the first and second control of the first embodiment.
Figure 19:
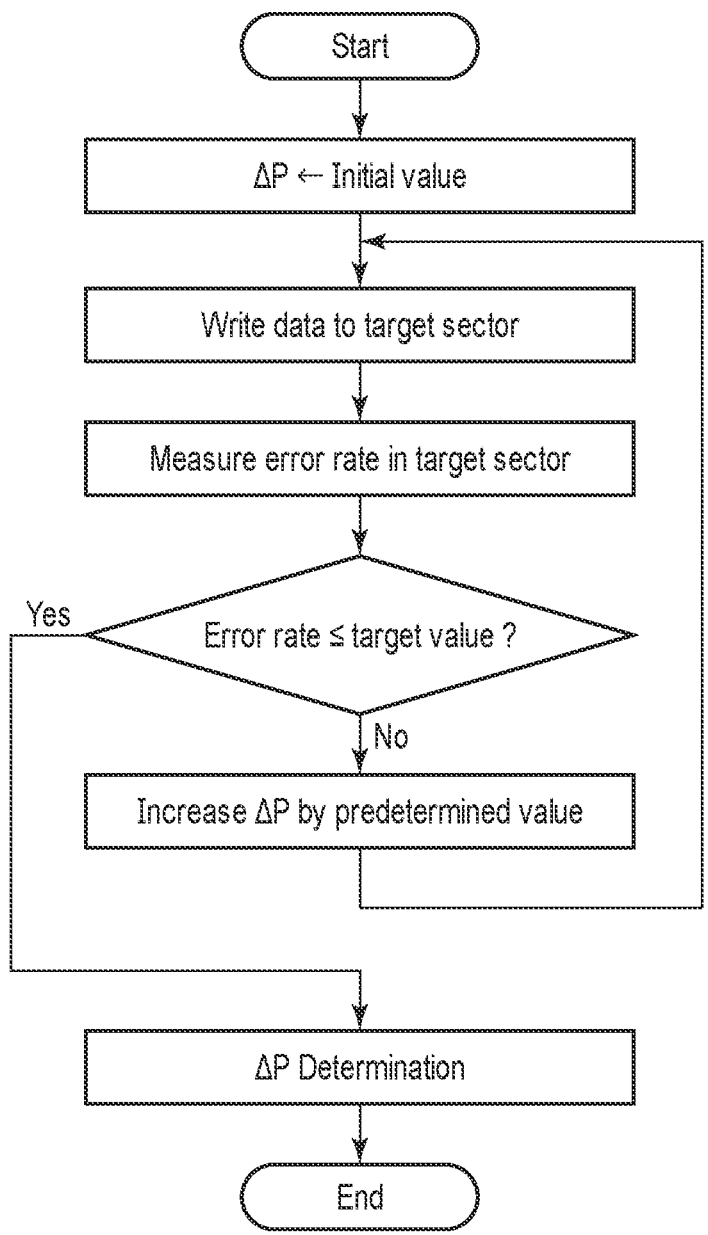
FIG. 19 is a flowchart schematically showing the third, fourth, and fifth control of the first embodiment.
Figure 20:
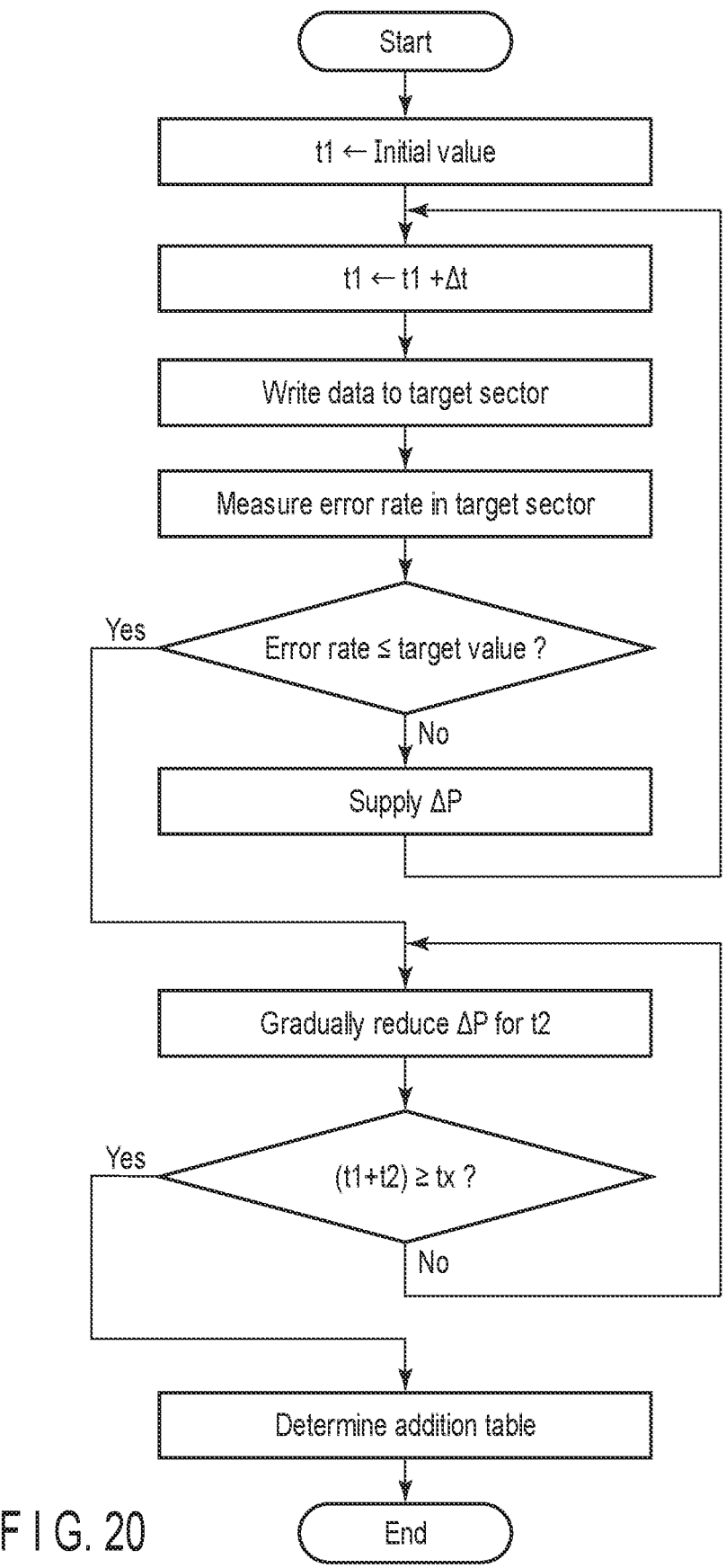
FIG. 20 is a flowchart schematically showing the sixth and seventh control of the first embodiment.

The first control and second control for measurement of the spacing saturation time are schematically shown in the flowchart of FIG. 18. The notation "txs" is an increase limit value of the specified time tx. The third control, fourth control, and fifth control configured to obtain the spacing saturation time tx are schematically shown in the flowchart of FIG. 19. The sixth control and seventh control configured to create the additional electric power table 23a are schematically shown in the flowchart of FIG. 20.

By setting the first time t1 and additional electric power ΔP according to the additional electric power table 23a, it is possible to securely lead the spacing H to the target value Hs without being affected by the influence of the individual difference of the magnetic head 10, position of the magnetic disk 2 in the radial direction, change in the environmental temperature, and the like and, moreover, to shorten the time required for the spacing H to reach the target value Hs. The responsiveness of the spacing H based on the control of the electric power P is improved. Reduction in wait for rotation due to preheat can be realized, and improvement in the performance at the time of data write can also be realized.

{2} Second Embodiment

The controller 20 executes control of supplying electric power (first electric power) P higher than the steady electric power (second electric power) Ps configured to make the spacing H become saturated in advance at the target value Hs at startup of data read to the electric heater 15 for the specified time tx and, after an elapse of the specified time tx, gradually reducing the electric power P to be supplied to the electric heater 15 to the steady electric power Ps.

More specifically, the controller 20 executes, as shown in FIG. 10, when supplying the steady electric power Ps of an amount enabling the spacing H to become saturated at the target value Hs to the electric heater 15, control of supplying the fixed additional electric power ΔP for the initial first time t1 and supplying the gradually-decreasing additional electric power ΔP for the subsequent second time t2. Then, at the time of data read after an elapse of the second time t2, the controller 20 continues supply of the steady electric power Ps so that the spacing H can maintain the state where the spacing H has reached the target value Hs. Owing to this control, it is possible to make the time required for the spacing H to reach the target value Hs shorter as compared with the case where only the steady electric power Ps is supplied.

Regarding the values of the first time t1 and additional electric power ΔP to be supplied for the first time t1, the controller 20 variably sets the values on the basis of the additional electric power table 23a (to be described later) stored in the flash ROM 23. The contents of the additional electric power table 23a are made freely rewritable according to the measurement result and the like. Regarding the method of controlling the electric power P, any one of phase control, voltage control, on/off control, and the like may be used. The preamplifier 22 executes one of these control items.

Further, in order to cope with the fact that the levitation amount of the magnetic head 10 created by the slider 11 is affected by the influence of the individual difference of the magnetic head 10, seek position of the magnetic disk 2 in the radial direction, change in the environmental temperature, and the like and does not become constant, the controller 20 includes the following eighth to fourteenth control sections 20h, 20i, . . . , 20n as functions of measuring the characteristics of the magnetic head 10 and periphery thereof.

Figure 21:
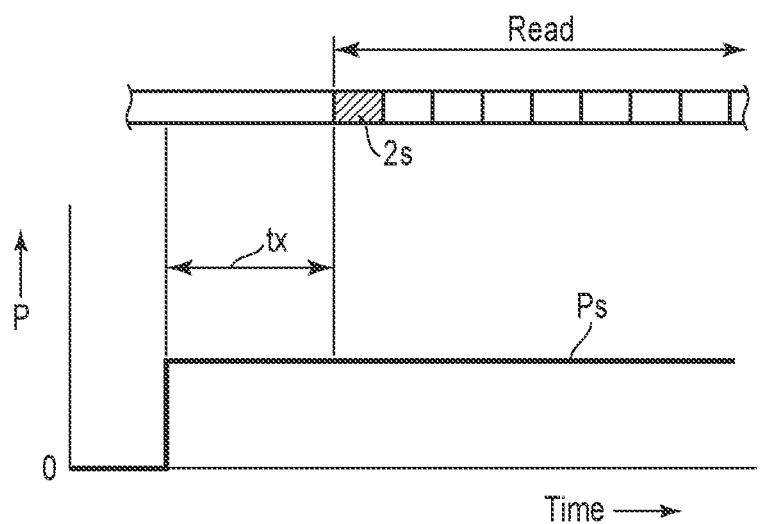
FIG. 21 is a view showing eighth control of the second embodiment.

(8) The eighth control section 20h executes, as shown in FIG. 21, eighth control of supplying the steady electric power Ps of an amount enabling the spacing H to become saturated at the target value Hs to the electric heater for just the specified time tx and subsequently reading data for error rate measurement from one predetermined target sector 2s of the magnetic disk 2 while supplying the same steady electric power Ps to the electric heater 15.

Figure 22:
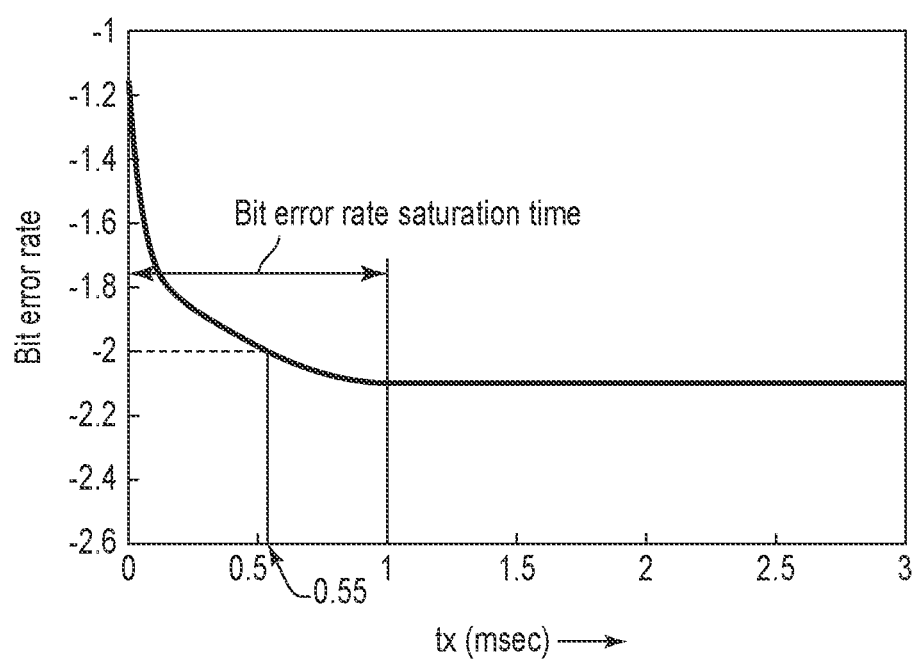
FIG. 22 is a view showing ninth control of the second embodiment.

(9) The ninth control section 20i executes ninth control of repetitively executing the above-described eighth control while changing the specified time tx of FIG. 21 in steps of a fixed amount of time Δt in the direction of increase in a stepwise manner, measuring the bit error rate of data to be read for each execution operation of the eighth control, and correlating the measurement result with the specified time tx as shown in FIG. 22. The above is control to be carried out to determine a time for which the electric power ΔP should be continuously supplied until the error rate reaches a value at which the error rate becomes saturated "for example, −2.1" or until the error rate reaches a permissible required value "for example, −2".

Owing to this control, the error rate saturation characteristics can be obtained. The measurement is error rate measurement in the same target sector 2s, and hence the cause of variation in the error rate becomes only the influence of the spacing H, and the error rate saturation characteristics can be treated by regarding the characteristics as being equivalent to the spacing saturation characteristics. In the example of FIG. 22, a time of "3 msec" or longer is given as the preheat time (electric power addition time) and a time in which a sufficiently saturated error rate can be obtained is measured, whereby it is possible to measure the error rate saturation time "1 msec" and determinably consider the aforementioned error rate saturation time to be the spacing saturation time. Further, the error rate saturation time can be defined by also a required error rate at which no read error occurs and, for example, when the required error rate at which no read error can occur is "−2.0", "0.55 msec" is obtained.

(10) The tenth control section 20j executes, as indicated by a broken line in FIG. 23, tenth control of selecting the specified time tx at the time when the bit error rate becomes the target value (saturation value or required value), the specified time tx being among the specified times tx changing in a stepwise manner in the above-described ninth control, as the spacing saturation time, supplying the electric power "Ps+ΔP" to the electric heater 15 within the spacing saturation time tx (=1.0 msec or 0.6 msec) and, after an elapse of the spacing saturation time tx, reading data for error rate measurement from the above-described target sector 2s while supplying the steady electric power Ps to the electric heater 15.

(11) The eleventh control section 20k executes, as indicated by a solid line in FIG. 23, eleventh control of setting the first time t1 at the beginning of the spacing saturation time tx of the above-described tenth control, supplying the predetermined additional electric power ΔP for the first time t1, and gradually reducing the additional electric power ΔP for the remaining second time t2 (=tx−t1) extending to the end of the specified time tx.

(12) The twelfth control section 20l executes twelfth control of repetitively executing the above-described eleventh control while changing the additional electric power ΔP in the direction of increase in a stepwise manner in a state where the spacing saturation time tx of the above-described tenth control is set by shortening the length thereof, measuring the bit error rate of data to be read from the above-described target sector 2s for each execution operation of the eleventh control, and correlating the measurement result with the value of the additional electric power ΔP in the same manner as FIG. 14 and FIG. 15 of the first embodiment.

(13) The thirteenth control section 20m executes thirteenth control of changing the first time t1 of FIG. 23 in the direction of increase in steps of a fixed amount of time in a stepwise manner, supplying, for the first time t1, the additional electric power ΔP at the time when the bit error rate measured in the above-described twelfth control becomes saturated, repetitively executing the above-described eleventh control while gradually reducing the additional electric power ΔP for the remaining second time t2 (=tx−t1) extending to the end of the spacing saturation time tx, measuring the bit error rate of data to be read from the above-described target sector 2s for each execution operation of the eleventh control, correlating the measurement result with the value of the additional electric power ΔP in the same manner as FIG. 16 of the first embodiment, and retaining the first time t1 changing in a stepwise manner as a parameter.

(14) The fourteenth control section 20n executes, in the same manner as FIG. 17 of the first embodiment, fourteenth control of determining a relationship between the first time t1 at the time when the saturation error rate of each bit error rate measured in the above-described thirteenth control becomes the predetermined value (saturation value or required value) and additional electric power ΔP as an additional electric power table, and storing the additional electric power table 23a in the flash ROM 23. An additional electric power table 23a corresponding to one saturation error rate may be stored in the flash ROM 23, and a large number of additional electric power tables 23a each corresponding to each of saturation error rates of the bit error rates may be stored in the flash ROM 23.

By setting the first time t1 and additional electric power ΔP according to the additional electric power table 23a, it is possible to securely lead the spacing H to the target value Hs without being affected by the influence of the individual difference of the magnetic head 10, position of the magnetic disk 2 in the radial direction, change in the environmental temperature, and the like and, moreover, to shorten the time required for the spacing H to reach the target value Hs. The responsiveness of the spacing H based on the control of the electric power P is improved. Reduction in wait for rotation due to retry of data read can be realized, and improvement in the performance at the time of data write can also be realized.

At the time of data read, as at the time of data write, adjustment of the first time t1 and additional electric power ΔP based on the output gain adjustment value, output voltage of the spacing sensor 16, and the like can be carried out in addition to adjustment of the first time t1 and additional electric power ΔP based on the measurement of the bit error rate. The output gain adjustment value refers to a gain value optimizing a read signal output from the preamplifier 22 at the input of the RDC, and carries out adjustment in such a manner that the output value in the RDC comes to have a fixed amount.

The saturation characteristics of the output gain adjustment value of the target sector 2s relative to the supply time (specified time) tx of the additional electric power ΔP are shown in FIG. 24. The above characteristics are identical to the error rate saturation characteristics of FIG. 22 and hence, by treating the output gain value as the measurement result of the bit error rate, the same adjustment of the first time t1 and additional electric power ΔP is enabled. When determination is made not on the basis of the saturation value but on the basis of the required value, no required absolute value exists in the output gain adjustment value, and hence the required value can be defined by a relative value obtained by adding a certain fixed value by using the saturation adjustment value as a reference.

The configuration of the spacing sensor (HDI sensor) 16 and peripheral circuit thereof is schematically shown in FIG. 25, and relationship between the output voltage Vd of the spacing sensor 16 and supply time (specified time) tx of the additional electric power ΔP is shown in FIG. 26.

A constant electric current is made to flow through the spacing sensor 16 which is a resistance element from a constant-current source 30, voltage created across the spacing sensor 16 is amplified by a differential amplifier 31, and amplified voltage is regarded as the output voltage Vd of the spacing sensor 16. The output voltage Vd is similar to the error rate saturation characteristics of FIG. 22, and hence by treating the output voltage Vd as the measurement result of the bit error rate, it is possible to carry out the same adjustment of the first time t1 and additional electric power ΔP. When determination is made not on the basis of the saturation value but on the basis of the required value, no required absolute value exists in the value of the output voltage Vd, and hence the required value can be defined by a relative value obtained by subtracting a certain fixed value by using the saturation adjustment value as a reference.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk;
   a magnetic head including a write element used to write data to the magnetic disk, a read element used to read data from the magnetic disk, and further including a heater which generates heat by electric power supplied thereto and expands the magnetic head toward the magnetic disk side; and
   a controller which supplies, at the time of startup of data write, fixed additional electric power for an initial first time of a specified time while supplying steady electric power to the heater for the specified time, and supplies gradually-decreasing additional electric power for a remaining second time of the specified time, the steady electric power being used to make spacing between the magnetic disk and the magnetic head become saturated at a target value.

2. The device of claim 1, wherein
the controller variably sets values of the first time and the additional electric power to be supplied for the first time.

3. The device of claim 1, wherein
the controller includes first to seventh control sections as functions used to measure the characteristics of the magnetic head and a peripheral part thereof,
the first control section executes first control of supplying first steady electric power Ps to the heater for just the specified time and subsequently writing data for error rate measurement to a predetermined sector of the magnetic disk while supplying second steady electric power Ps' of an amount enabling the spacing at the time of data write to become saturated at the target value to the heater,
the second control section executes second control of repetitively executing the first control while changing the specified time in steps of a fixed amount of time Δt in the direction of increase in a stepwise manner, measuring a bit error rate of data to be written to the sector for each execution operation of the first control, and correlating a measurement result with the specified time,
the third control section executes third control of selecting the specified time at the time when the bit error rate becomes a saturation value or required value, the specified time being among the specified times changing in a stepwise manner in the second control, as a spacing saturation time tx, supplying electric power, which is a sum of the second steady electric power Ps' and an additional electric power ΔP to the heater within the spacing saturation time tx and, after an elapse of the spacing saturation time tx, writing data for error rate measurement to the sector while supplying the second steady electric power Ps' to the heater,
the fourth control section executes fourth control of setting a first time t1 at the beginning of the spacing saturation time tx in the third control, supplying the additional electric power ΔP for the first time t1, and gradually reducing the additional electric power ΔP for a remaining second time t2 (=tx−t1) extending to the end of the spacing saturation time tx,
the fifth control section executes fifth control of repetitively executing the fourth control while changing the additional electric power ΔP in the direction of increase in a stepwise manner in a state where the spacing saturation time tx of the third control is set by shortening the length thereof, measuring the bit error rate of data to be written to the sector for each execution operation of the fourth control, and correlating a measurement result with the value of the additional electric power ΔP, the sixth control section executes sixth control of changing the first time t1 in the direction of increase in steps of a fixed amount of time in a stepwise manner, supplying, for the first time t1, the additional electric power ΔP at the time when the bit error rate measured in the fifth control becomes saturated, repetitively executing the fourth control while gradually reducing the additional electric power ΔP for the remaining second time t2 (=tx−t1) extending to the end of the spacing saturation time tx, measuring the bit error rate of data to be written to the sector for each execution operation of the fourth control, correlating a measurement result with the value of the additional electric power ΔP, and retaining the first time t1 changing in a stepwise manner as a parameter, and the seventh control section executes seventh control of determining a relationship between the first time t1 at the time when a saturation error rate of each bit error rate measured in the sixth control becomes a predetermined value and the additional electric power ΔP as an additional electric power table.

4. The device of claim 3, wherein
the controller variably sets values of the first time t1 and the additional electric power ΔP on the basis of the additional electric power table.

5. A magnetic disk device comprising:
a magnetic disk;
a magnetic head including a write element used to write data to the magnetic disk, a read element used to read data from the magnetic disk, and further including a heater which generates heat by electric power to be supplied thereto and expands the magnetic head toward the magnetic disk side; and
a controller which supplies, at the time of startup of data read, fixed additional electric power for an initial first time of a specified time while supplying steady electric power to the heater for the specified time, and supplies gradually-decreasing additional electric power for a remaining second time of the specified time, the steady electric power being used to make spacing between the magnetic disk and the magnetic head become saturated at a target value.

6. The device of claim 5, wherein
the controller variably sets values of the first time and the additional electric power to be supplied for the first time.

7. The device of claim 5, wherein
the controller includes eighth to fourteenth control sections as functions used to measure the characteristics of the magnetic head and a peripheral part thereof, the eighth control section supplies first steady electric power Ps to the heater for just the specified time and subsequently reads data for error rate measurement from a predetermined sector of the magnetic disk while supplying the first steady electric power Ps to the heater, the ninth control section executes ninth control of repetitively executing the eighth control while changing the specified time in steps of a fixed amount of time Δt in the direction of increase in a stepwise manner, measuring a bit error rate of data to be read for each execution operation of the eighth control, and correlating a measurement result with the specified time, the tenth control section executes tenth control of selecting the specified time at the time when the bit error rate becomes a saturation value or required value, the specified time being among the specified times changing in a stepwise manner in the ninth control, as a spacing saturation time tx, supplying electric power, which is a sum of the first steady electric power Ps and an additional electric power ΔP to the heater within the spacing saturation time tx and, after an elapse of the spacing saturation time tx, reading data for error rate measurement from the sector while supplying the first steady electric power Ps to the heater, the eleventh control section executes eleventh control pattern of setting a first time t1 at the beginning of the spacing saturation time tx in the ninth control, supplying the additional electric power ΔP at the first time t1, and gradually reducing the additional electric power ΔP for a remaining second time t2 (=tx−t1) extending to the end of the specified time, the twelfth control section executes twelfth control of repetitively executing the eleventh control while changing the additional electric power ΔP in the direction of increase in a stepwise manner in a state where the spacing saturation time tx of the tenth control is set by shortening the length thereof, measuring the bit error rate of data to be read from the sector for each execution operation of the eleventh control, and correlating a measurement result with the value of the additional electric power ΔP, the thirteenth control section executes thirteenth control of changing the first time t1 in the direction of increase in steps of a fixed amount of time in a stepwise manner, supplying, for the first time t1, the additional electric power ΔP at the time when the bit error rate measured in the twelfth control becomes saturated, repetitively executing the eleventh control while gradually reducing the additional electric power ΔP for the remaining second time t2 (=tx−t1) extending to the end of the spacing saturation time tx, measuring the bit error rate of data to be read from the sector for each execution operation of the eleventh control, correlating a measurement result with the value of the additional electric power ΔP, and retaining the first time t1 changing in a stepwise manner as a parameter, and the fourteenth control section executes fourteenth control of determining a relationship between the first time t1 at the time when a saturation error rate of each bit error rate measured in the thirteenth control becomes a predetermined value and the additional electric power ΔP as an additional electric power table.

8. The device of claim 7, wherein
the twelfth control section, the thirteenth control section, and the fourteenth control section each treat an output gain adjustment value for a read signal of the read element as the measurement result of the bit error rate.

9. The device of claim 7, further comprising:
a spacing sensor used to detect the spacing between the magnetic head and the magnetic disk, wherein
the twelfth control section, the thirteenth control section, and the fourteenth control section each treat an output voltage of the spacing sensor as the measurement result of the bit error rate.

10. The device of claim 7, wherein
the controller variably sets values of the first time t1 and the additional electric power ΔP on the basis of the additional electric power table.

* * * * *